Sept. 4, 1956 A. N. BERNARDI 2,761,335
REAMER
Filed Sept. 29, 1953

ALFREDO N. BERNARDI INVENTOR

BY *CA Snow &Co.*

ATTORNEYS.

ed Sept. 4, 1956

United States Patent Office 2,761,335
Patented Sept. 4, 1956

2,761,335

REAMER

Alfredo N. Bernardi, Highwood, Ill.

Application September 29, 1953, Serial No. 382,981

1 Claim. (Cl. 77—73)

This invention relates to a reamer arranged in the hollow handle of a pipe cutting tool, the primary object of the invention being to provide a reamer which may be operated to remove the usual edge or burr at the end of a pipe formed incident to the cutting of the pipe by the cutting tool.

Another object of the invention is to provide a reamer embodying groups of reamer blades of various sizes, for operating in the ends or over the ends of various sized pipes.

Still another object of the invention is to provide a reamer comprising an outer open ended tubular housing and groups of reamers held therein, the tubular housing providing a guard for guarding the cutters of the reamer and protecting the hands of the person operating the tool, against injury by contact with the cutting blades of the tool.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figures 1, 2, 3, 4, 5:
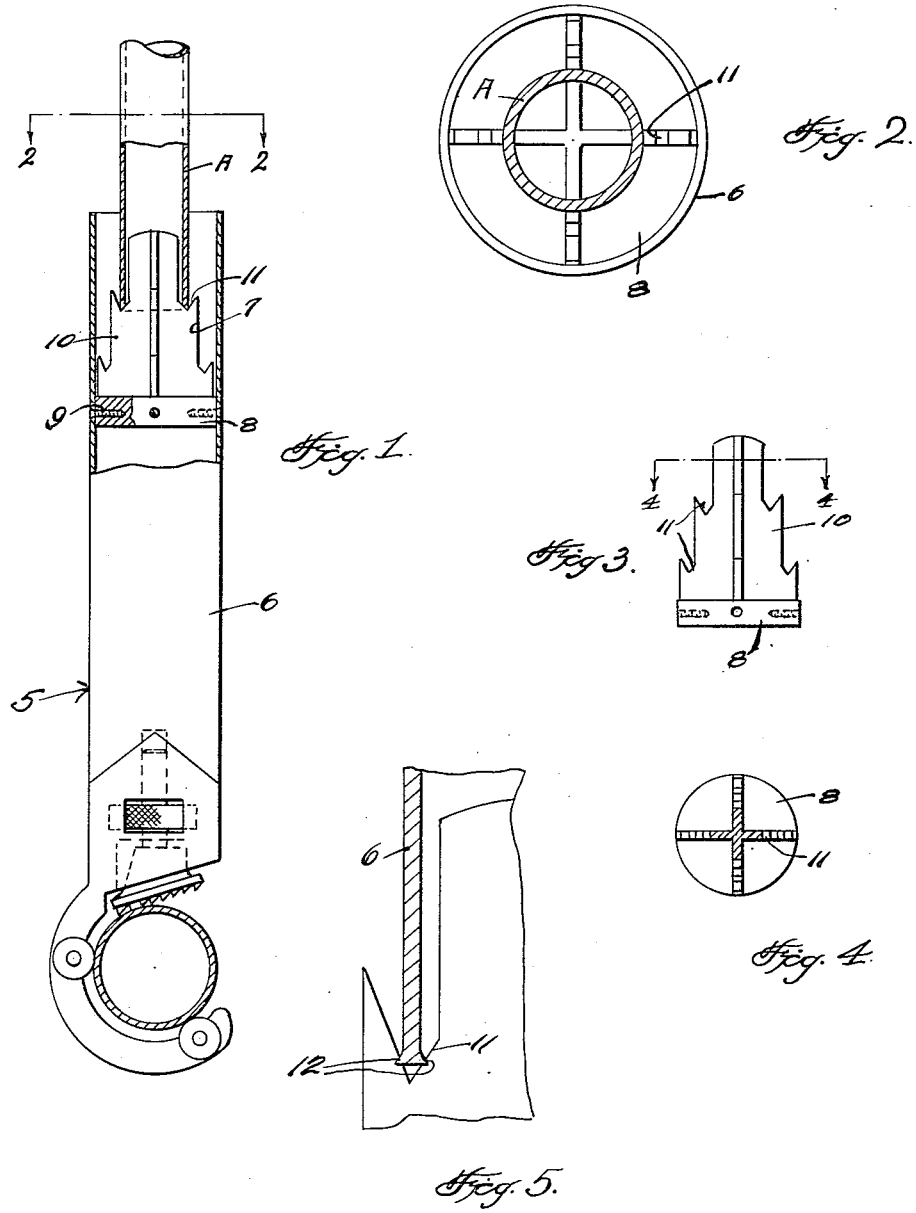
Figure 1 is an elevational view of a pipe cutting tool, partly in section, illustrating a reaming unit constructed in accordance with the invention, as mounted in the open end of the handle of the tool.
Fig. 2 is a sectional view taken on line 2—2 of Fig. 1.
Fig. 3 is an elevational view of the reaming unit.
Fig. 4 is a sectional view taken on line 4—4 of Fig. 3.
Fig. 5 is an enlarged fragmental elevational view partly in section, illustrating the reamer as positioned over the end of a cut pipe A, to remove the burr, formed incident to the cutting of the pipe.

Referring to the drawing in detail, the reference character 5 indicates the conventional type cutter, which is provided with a hollow handle 6 with its end open to accommodate the reaming unit 7, forming the essence of the present invention.

The reaming unit 7 embodies a base 8 which is circular and of a diameter to closely fit within the hollow handle, where it is secured as by means of the screws 9 that pass through openings in the handle, and have their threaded portions embedded in the base 8, as clearly shown by Fig. 1 of the drawing.

The reference character 10 indicates the blades of the reamer, which are secured to the base 8, the blades being four in number, and disposed at right angles with respect to each other, the blades having substantially V-shaped cutting or reaming notches 11 which are beveled so that when the cutting or reaming notches are positioned over the edge of a pipe which has been cut, the burr, which in Fig. 5 of the drawing is indicated by the reference character 12, will fall in the cutting or reaming notches with the result that when the handle 6 of the tool is rotated over the cut end of the pipe, the burr will be removed to permit the proper threading of the pipe for positioning of the pipe within an opening.

As clearly shown by Fig. 1 of the drawing, the blades are formed with pairs of these notches 11, and since the blades are wider at the base of the unit, than at the other end of the unit, it will be seen that the space between the groups of notches 11 will be varied, so that the device may be used in reaming pipes of various diameters.

It will also be noted that the end of the unit which may be termed the outer end, or the end nearest to the open end of the handle 6, normally lies within the confines of the handle 6, thereby guarding the operator against injury to his hands when handling or operating the tool to either cut a pipe or ream the end of the pipe which has been cut.

It will further be noted that because of the shape of the cutting notches 11, both the outer and inner edges of the cut end of the pipe are exposed to the cutting edges of the blades insuring a true and even reaming or cutting operation.

Having thus described the invention, what is claimed is:

A tool of the class described, comprising a tubular open-ended handle, a blade unit embodying a disc-like base of a diameter to closely fit within the handle, means securing said base within the handle at a point a substantial distance from the open end thereof, groups of elongated blade members radiating from a common center, fixedly secured to one of said flat surfaces of said base and extended at right angles with respect to each other on said flat surface, said blades having reaming notches formed in the side edges thereof facing towards the open end of said handle and disposed in spaced relation with each other longitudinally of said blades, and the edges of the blade in which said reaming notches are formed being inclined inwardly towards the open end of said handle said handle projecting beyond the outer ends of said blades to form a projecting covering for said blades.

References Cited in the file of this patent

UNITED STATES PATENTS

| | | |
|---|---|---|
| 499,098 | Comstock | June 6, 1893 |
| 2,470,392 | Gassmann | May 17, 1949 |